(12) United States Patent
Tanaka

(10) Patent No.: US 8,622,089 B2
(45) Date of Patent: Jan. 7, 2014

(54) CHECK VALVE AND STORAGE BODY EQUIPPED THEREWITH

(76) Inventor: Mikio Tanaka, Tenri (JP)

( * ) Notice: Subject to any disclaimer, the term of this patent is extended or adjusted under 35 U.S.C. 154(b) by 106 days.

(21) Appl. No.: 13/143,231

(22) PCT Filed: Dec. 29, 2010

(86) PCT No.: PCT/JP2010/073830
§ 371 (c)(1),
(2), (4) Date: Sep. 20, 2011

(87) PCT Pub. No.: WO2012/090337
PCT Pub. Date: Jul. 5, 2012

(65) Prior Publication Data
US 2012/0170875 A1 Jul. 5, 2012

(51) Int. Cl.
*F16K 15/14* (2006.01)
(52) U.S. Cl.
USPC .............................. 137/843; 383/49; 137/855
(58) Field of Classification Search
USPC .............................. 137/843, 855; 383/49, 103
See application file for complete search history.

(56) References Cited

U.S. PATENT DOCUMENTS 4,134,535 A * 1/1979 Barthels et al. ................ 383/102
5,388,910 A * 2/1995 Koyanagi ........................ 383/100

FOREIGN PATENT DOCUMENTS

| JP | 3003479 U | 10/1994 |
|---|---|---|
| JP | 9-112721 A | 5/1997 |
| JP | 2691881 B2 | 12/1997 |
| JP | 51-148316 | 2/2000 |
| JP | 3012968 B2 | 2/2000 |
| JP | 4436925 B1 | 3/2010 |

\* cited by examiner

*Primary Examiner* — Kevin Lee
*Assistant Examiner* — Macade Brown
(74) *Attorney, Agent, or Firm* — Birch, Stewart, Kolasch & Birch, LLP

(57) ABSTRACT

The present invention provides a check valve 10 through which a fluid can satisfactorily open and pass when the fluid flows forward, and a bag 1a including the check valve and having a function of satisfactorily discharging a fluid. This check valve includes a one-side airtight base sheet 31, an inlet 11, a valve sheet 61, an auxiliary sheet 51, and the other-side airtight base sheet 21. The portion between the other-side airtight base sheet 21 and the valve sheet 61 serves as a valve flow channel 13, and a fluid flowing forward passes through the valve flow channel 13 from the inlet 11 and flows out from the outlet 12. The valve sheet 61 is fixed at its upstream end by the fixation portion 14, is freely movable at its downstream end. On the fixation portion 14 and the one-side airtight base sheet 31 of the inlet 11, the introduction recesses 15 are formed.

7 Claims, 7 Drawing Sheets

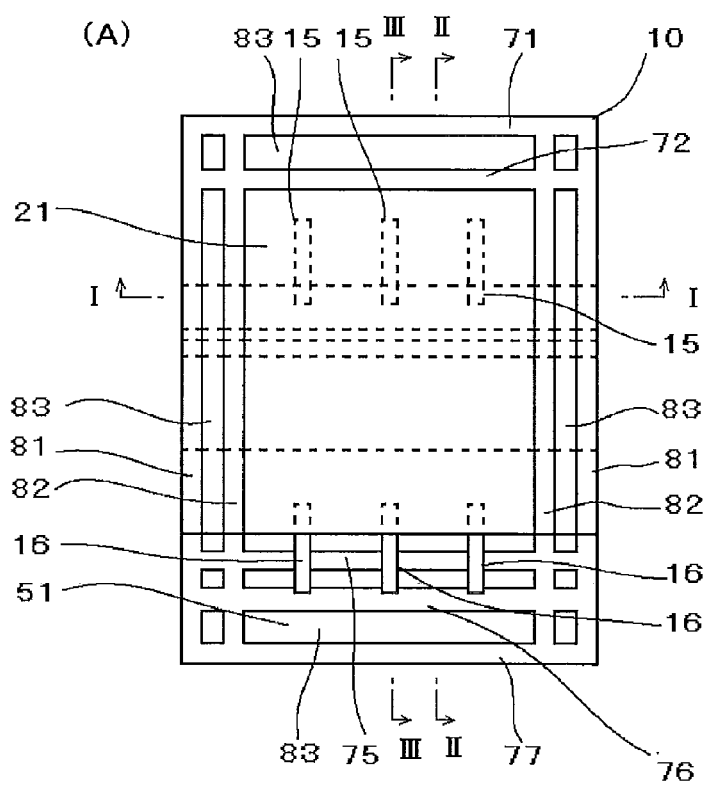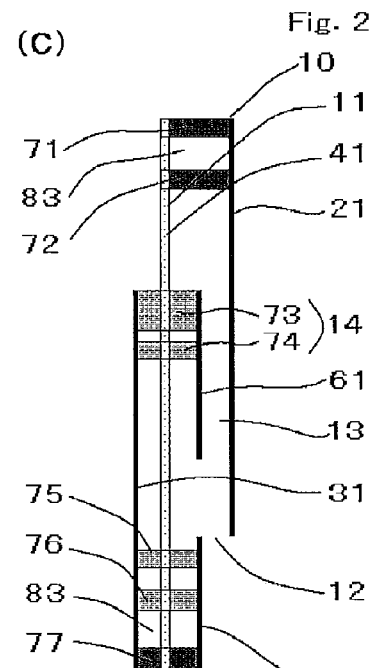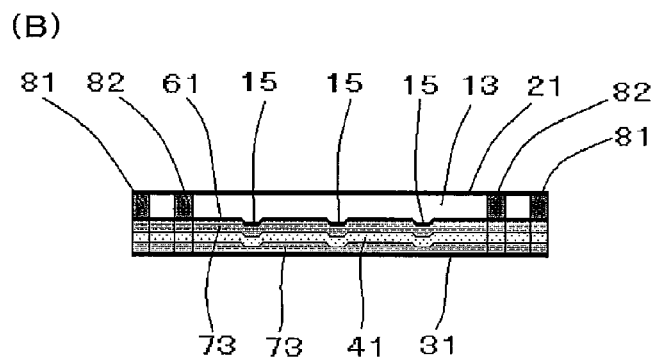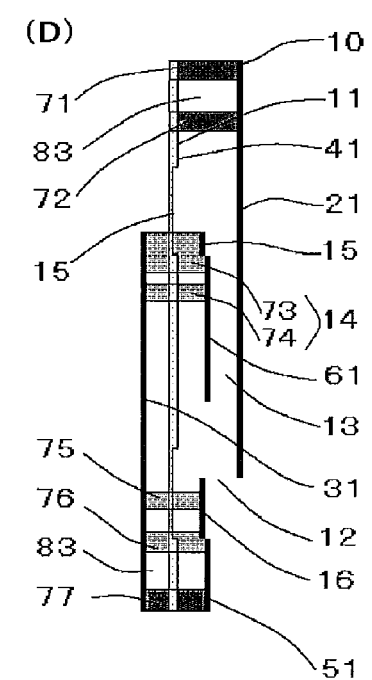
Fig. 2

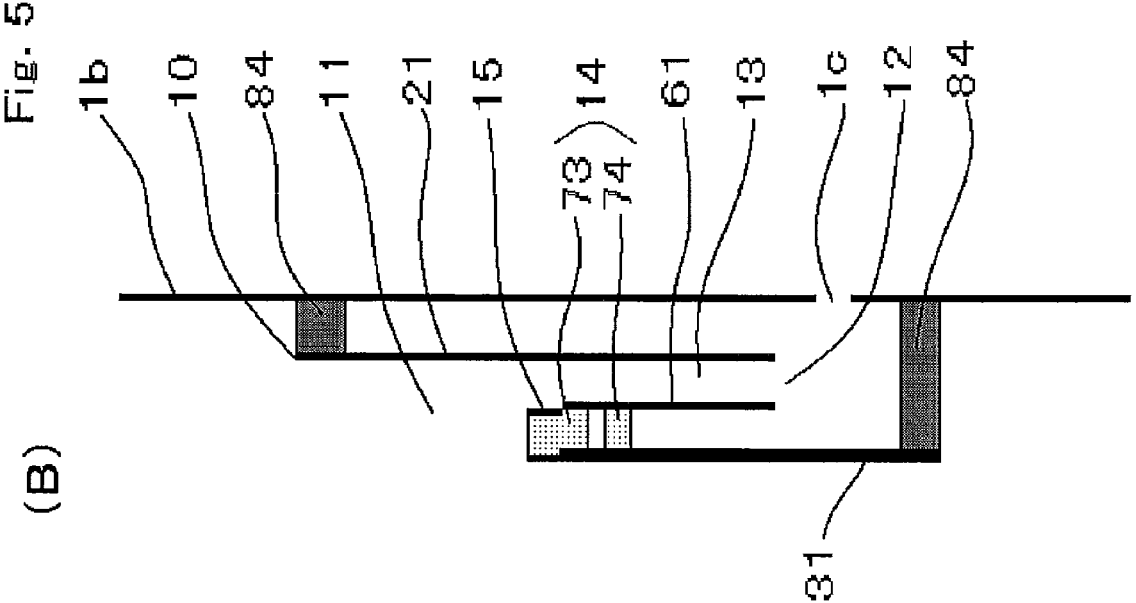
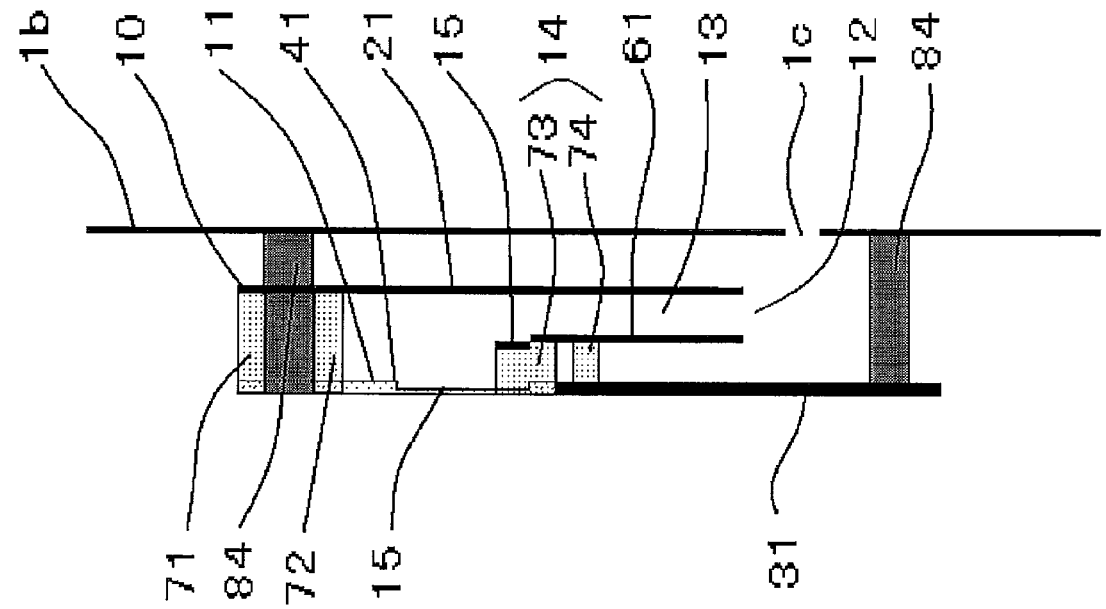
Fig. 5

CHECK VALVE AND STORAGE BODY EQUIPPED THEREWITH

TECHNICAL FIELD

The present invention relates to a check valve and a storage body equipped therewith.

There are conventionally sealed bags in which an item storage portion including a space for storing items such as clothing and food can be sealed off. In such a sealed bag, a check valve that joins the item storage portion and the bag outside portion in a manner allowing ventilation therebetween for exhausting various gasses such as air in the item storage portion and maintaining this state is used.

When exhausting the gases, the check valve can allow an air flow to pass through in one direction and blocks an air flow to pass through in the other direction by opening and closing an air flow passage space as a space through which gases pass.

The inventor of the present invention has developed many inventions relating to check valves, and one of these conventional examples is the check valve described in Patent Document 1. This check valve includes outer sheets made of a soft resin and a plurality of valve sheets, and as the valve sheets, at least two sheets of an upstream side valve sheet and a downstream side valve sheet are paired and bonded to a one-side outer sheet. The upstream side valve sheet is bonded at the upstream side to the one-side outer sheet, and the downstream side thereof is movable with respect to the outer sheet. The downstream side valve sheet is bonded as described above at the downstream side, and the upstream side is movable with respect to the outer sheet. The movable portions (that is, the downstream side of the upstream side valve sheet and the upstream side of the downstream side valve sheet) can come into close contact with, and separate from the other-side outer sheet. The valve sheets constituting the pair are bonded to the one-side outer sheet, and this one-side outer sheet is made of nonwoven cloth breathable over the entire surface. This check valve is used by disposing a portion with nonwoven cloth inside the sealed bag as an inlet when a fluid flows forward to the check valve and disposing an outlet from the check valve at the outside of the sealed bag.

The check valves described in Patent Document 2 and Patent Document 3 also use breathable nonwoven cloth, and are attached to a sealed bag by disposing a portion with the nonwoven cloth inside the sealed bag as an inlet when a fluid flows forward to the check valve and disposing an outlet from the check valve at the outside of the sealed bag.

Each of the check valves disclosed in these Patent Documents is attached across the inside and outside of a sealed bag as described above. Particularly, the check valve is attached to a sealed bag so that the movable portions of the valve sheets are substantially positioned outside the sealed bag.

PRIOR ART DOCUMENTS

Patent Documents

Patent Document 1: Japanese Patent No. 4436925
Patent Document 1: Japanese Patent No. 2691881
Patent Document 1: Japanese Patent No. 3012968

SUMMARY OF THE INVENTION

Problem to be Solved by the Invention

The inventor of the present invention has tried to improve these check valves to develop a check valve the whole of which could be disposed inside a sealed bag. However, when the whole of the check valve is disposed inside a sealed bag, the check valve does not normally work during forward flowing. In detail, during forward flowing, in some cases, the pressure inside the sealed bag increases, and a fluid flows out from the inside to the outside of the sealed bag through the check valve, and on the other hand, in the case where the check valve is used to prevent a fluid from flowing into the inside from the outside of the sealed bag, when the pressure inside the sealed bag increases, the sheets such as valve sheets, etc., constituting the check valve are pressurized in the thickness direction and the whole check valve is pressed against the bag sheet of the sealed bag, so that the check valve cannot be opened, and the fluid cannot flow out through the check valve.

In view of the above-described circumstances, an object of the present invention is to provide a check valve through which allows a fluid to satisfactorily open the valve and pass. Particularly, an object of the present invention is to provide a check valve that allows a fluid to satisfactorily open the valve and pass through it even when a pressure is applied in the thickness direction of valve sheets of the check valve by disposing the whole check valve inside a sealed bag. Another object of the present invention is to provide a storage body having an excellent fluid passage function by being equipped with the check valve.

Means for Solving the Problem

The present invention provides a check valve that includes a plurality of layered sheets and allows a fluid to pass in a forward direction from an inlet to an outlet and blocks a flow of a fluid in a reverse direction from the outlet to the inlet by opening and closing a valve flow channel as a space for fluid passage formed between the sheets, where the plurality of sheets include a plurality of base sheets including a one-side base sheet and the other-side base sheet and at least one valve sheet disposed between the plurality of base sheets, the valve sheet includes a fixation portion bonded to at least the one-side base sheet, the fixation portion is bonded across the valve flow channel, and a portion on the downstream side of the fixation portion of the valve sheet is separable from the one-side base sheet, and a portion between the valve sheet and the other-side valve sheet or another valve sheet layered on the valve sheet is formed as the valve flow channel, wherein a fluid introduction recess recessed in the thickness direction is formed on at least one of the other-side valve sheet or another valve sheet layered on the valve sheet constituting the valve flow channel and the valve sheet, and the fluid introduction recess is provided on the fixation portion of the valve sheet or at a position on the upstream side of the fixation portion in the up-down direction of the flow channel.

Further, the present invention can be carried out as a check valve in which the inlet is positioned on the front surface or the back surface of the check valve, the outlet is positioned on the back surface or the front surface opposite the inlet, the front surface or the back surface of the check valve is along the surface or the inner surface of a storage body, the entire periphery of the check valve is bonded to the storage body by a storage body fixing seal, and an area from the inlet to the outlet through the valve flow channel is positioned within a region surrounded by the storage body fixing seal.

Further, the present invention can be carried out as a check valve in which a part of the one-side base sheet is formed as a fluid passage portion breathable to allow an air flow in the forward direction to pass through in the front-rear direction, and the fluid passage portion is an inlet through which an air flow in the forward direction flows to the inside of the check valve, and the fluid passage portion is disposed on the upstream side of the fixation portion of the one-side base sheet, and the fluid introduction recess is formed from the fluid passage portion to the fixation portion.

Further, the present invention can be carried out as a check valve in which the fixation portion includes a first valve fixing seal and a second valve fixing seal formed on the downstream side of the first valve fixing seal, and the fluid introduction recess is not formed on the second valve fixing seal but is formed at a position including the first valve fixing seal.

Further, the present invention provides a storage body to which the check valve is attached, wherein the storage body includes bag sheets made of a soft resin, and the entire periphery of the check valve is bonded to the inside or the outside of the bag sheet.

Effects of the Invention

The present invention provides a check valve that allows a fluid to satisfactorily open the valve and pass through it when the fluid flows forward. Specifically, by disposing the whole check valve inside a sealed bag, a fluid can satisfactorily open the valve and pass through it even when a pressure is applied in the thickness direction of the valve sheet of the check valve. Further, the present invention provides a storage body having an excellent fluid passage function by being equipped with the check valve.

BRIEF DESCRIPTION OF THE DRAWINGS

FIG. 2(A) is a front view of the same check valve, FIG. 2(B) is a sectional view taken along line I-I of FIG. 2(A), FIG. 2(C) is a sectional view taken along line II-II of FIG. 2(A), and FIG. 2(D) is a sectional view taken along line of FIG. 2(A).

FIG. 5(A) is an essential portion sectional view showing a state that a check valve according to a third preferred embodiment is attached to a bag, and FIG. 5(B) is an essential portion sectional view showing a state that a check valve according to a fourth preferred embodiment is attached to a bag.

MODES FOR CARRYING OUT THE INVENTION

Hereinafter, preferred embodiments of the present invention will be described with reference to the drawings. Expressions "front, rear," "up, down, left, and right," "longitudinal, lateral," and "one, the other" expressing positions and directions show only relative position relationships, and are not intended to limit the preferred embodiments. The expressions "upstream, downstream" are based on a forward direction (a direction in which a fluid is allowed to pass when the check valve is used, that is, a flow direction when the valve opens).

Figure 1:
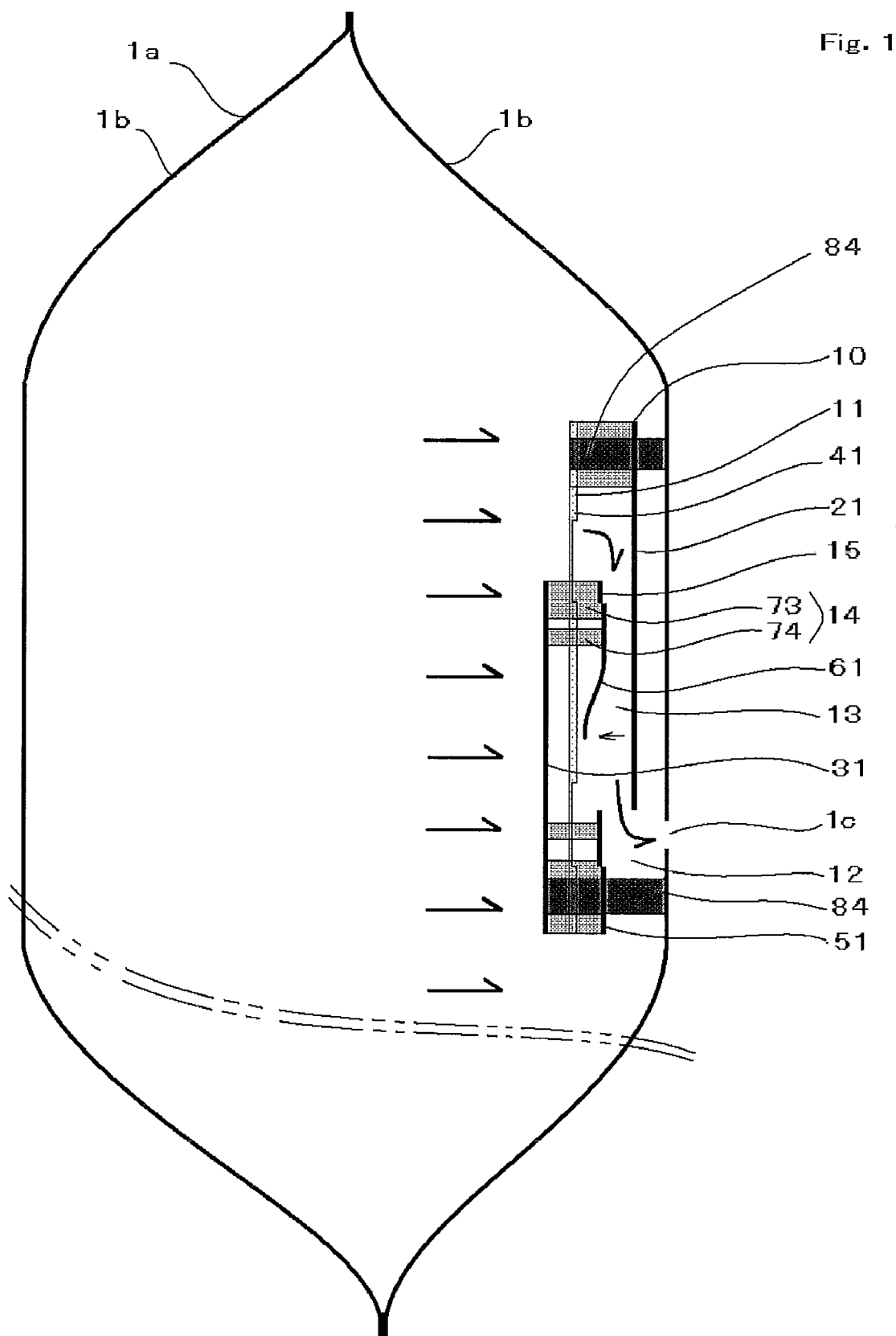
FIG. 1 is a sectional view of a storage bag equipped with a check valve according to a first preferred embodiment of the present invention.

As shown in FIG. 1, a check valve 10 according to the present embodiment is attached to a bag 1a as a storage body.

The bag 1a is formed to have a bag shape from bag sheets 1b with flexibility and airtightness by welding or bonding by an adhesive agent, and inside the bag, a storing object such as coffee beans are stored. Gases are radiated from coffee beans, so that when coffee beans are stored in a sealed bag, a check valve may be used to exhaust the generated gases to the outside of the sealed bag, and the present embodiment proposes a check valve 10 optimum for a coffee bag. This check valve 10 is attached to the inside of the bag 1a, specifically, aligned with an opening 1c provided in the bag sheet 1b and attached to the inner surface side of the bag sheet 1b. In detail, the front surface side of the check valve 10 (the front surface in FIG. 2(A), the upper surface in FIG. 2(B), and the right side surface in FIG. 2(C) and FIG. 2(D)) are fixed to the rear surface of the bag sheet 1b by storage body fixing seals 84 by welding or bonding using an adhesive agent.

The entire periphery of the check valve 10 is sealed and attached to the bag sheet 1b by the storage body fixing seals 84 as described above, and a fluid that flowed into the inside of the bag 1a from an inlet 11 on the back surface side inside the upper portion passes through a valve flow channel 13 of the check valve 10, and flows out to the outside of the bag 1a from the opening 1c through an outlet 12 on the front surface side of the lower portion. The drawings are drawn by arranging the upstream inlet 11 on the upper side and the downstream outlet 12 on the lower side. Therefore, in the entire following description, words such as up, upward, and upper portion expressing "up" positions can be read to mean "upstream," and words such as down, downward, and lower portion expressing "down" positions can be read to mean "downstream" unless otherwise stated.

Here, each sheet will be roughly described. This check valve 10 includes, as shown in FIG. 2, a total of five sheets including three base sheets of the other-side airtight base sheet 21, a one-side airtight base sheet 31, and a one-side breathable base sheet 41, a valve sheet 61, and an auxiliary sheet 51. The lateral widths of the five sheets (right-left widths in FIG. 2(A) and FIG. 2(B)) are set equal to each other. For convenience of description, in each sectional view, the thickness and intervals of the sheets are drawn to be larger than actual, however, in actuality, the sheets are layered in contact with each other.

The base sheets constitute an outer surface that forms a casing of the check valve 10, and two sheets of the other-side airtight base sheet 21 and one-side airtight base sheet 31 are made of simple bodies or composite bodies of a synthetic resin film without breathability (referred to as hereinafter for representing fluid permeability), and the one-side breathable base sheet 41 is made of a breathable sheet such as nonwoven cloth or woven cloth. The valve sheet 61 is attached movably for opening and closing the valve, and made of a simple body or a composite body of a synthetic resin film. For making the valve sheet 61 movable, the thickness of the valve sheet 61 to be used is preferably thinner than the thickness of the other-side airtight base sheet 21 and the one-side airtight base sheet 31, without limiting to this. The auxiliary sheet 51 is provided for balancing with the shape and thickness of the valve sheet 61 in relation to the valve sheet 61, and is preferably made of the same material with the same thickness as those of the valve sheet 61, without limiting to this.

Next, a position relationship and a bonded state of these sheets will be described.

Describing in order from the back surface side (left side in FIG. 2(C) and FIG. 2(D)), the one-side airtight base sheet 31 is disposed on the extreme back surface side, and on the front surface side thereof, the one-side breathable base sheet 41 is disposed. On the front surface side of the one-side breathable base sheet 41, the valve sheet 61 and the auxiliary sheet 51 are disposed, and on the front surface side of these, the other-side airtight base sheet 21 is disposed. Right and left ends of these sheets are bonded to each other by side seals in the same manner as in this type of check valve. For this bonding, welding such as heat seal or ultrasonic seal is preferable, and bonding using an adhesive agent is also possible (these can also be used not only for this sealing but also for other sealing). In this example, two side seals of a first side seal 81 and a second side seal 82 are applied although application of one side seal is also possible. The portion between the first side seal 81 and the second side seal 82 is a side non-sealed portion 83. To this side non-sealed portion 83, a storage body fixing seal 84 for sealing to the bag sheet 1b is applied, and accordingly, the check valve 10 is fixed to the bag sheet 1b.

Describing the relationship between the one-side airtight base sheet 31 and the one-side breathable base sheet 41, the one-side breathable base sheet 41 is disposed across substantially the entire length of the check valve 10, and the one-side airtight base sheet 31 is disposed on the back surface side of the one-side breathable base sheet 41. This one-side airtight base sheet 31 has, as shown in FIG. 2(C), an up-down length set shorter than that of the one-side breathable base sheet 41, and on the upper portion of the one-side breathable base sheet 41, the one-side airtight base sheet 31 is not layered and the one-side breathable base sheet 41 is exposed. The one-side breathable base sheet 41 is breathable as described above, and the exposed portion thereof is a fluid passage portion that serves as an inlet 11 into the inside of the check valve 10.

The one-side airtight base sheet 31 is layered on the lower portion of the one-side breathable base sheet 41, and the upper portion of the one-side airtight base sheet 31 is fixed to the one-side breathable base sheet 41 by a first valve fixing seal 73 and a second valve fixing seal 74. The first valve fixing seal 73 and the second valve fixing seal 74 connect the right and left sides of the bag (right and left side seals), and in this example, by sealing at least the second side seal 82 on the left and the second side seal 82 on the right, a boundary between the inlet 11 and the one-side airtight base sheet 31 is formed. In this example, two seals of the first valve fixing seal 73 and the second valve fixing seal 74 are provided, however, at least one seal will suffice. Further, the entire surface of the one-side airtight base sheet 31 at the lower portion (downstream side) of the boundary may be sealed to the one-side breathable base sheet 41.

The lower portion of the one-side airtight base sheet 31 is sealed to the lower portion of the one-side breathable base sheet 41 by an auxiliary fixing seal 75, a second lower end seal 76, and a first lower end seal 77. The auxiliary fixing seal 75, the second lower end seal 76, and the first lower end seal 77 also connect the right and left sides of the bag (right and left side seals) similar to the first valve fixing seal 73 and the second valve fixing seal 74, and in this example, seal at least the second side seal 82 on the left and the second side seal 82 on the right to each other. The portion between the second lower end seal 76 and the first lower end seal 77 is a non-sealed portion on the lower end. To this non-sealed portion, a storage body fixing seal 84 for sealing to the bag sheet 1b is applied, and accordingly, the check valve 10 is fixed to the bag sheet 1b. The one-side airtight base sheet 31 covers the one-side breathable base sheet 41 except for the inlet 11, and as shown in FIG. 5(A), the lower portion of the one-side breathable base sheet 41 covered by the one-side airtight base sheet 31 may not be provided. The one-side airtight base sheet 31 and the one-side breathable base sheet 41 may be divided up and down.

An original purpose of the one-side breathable base sheet 41 is to perform a filtering function. In detail, the purpose is to prevent fine particles such as fragments of coffee beans from entering the inside of the check valve 10 while breathability of the inlet 11 is secured. When contents of the bag 1a are items that do not produce fragments or a simple liquid or gas, as shown in FIG. 5(B), the one-side breathable base sheet 41 may not be provided.

Next, the valve sheet 61 will be described. The upper portion (preferably, the uppermost end) of the valve sheet 61 is sealed to the one-side breathable base sheet 41. In this example, the valve sheet is fixed by the above-described first valve fixing seal 73 and second valve fixing seal 74. These first valve fixing seal 73 and second valve fixing seal 74 serve as a fixation portion 14 described in the claims. However, the valve sheet 61 and the one-side airtight base sheet 31 are not necessarily bonded by the same seal, and may be bonded by different seals. The lower portion of the valve sheet 61 is not bonded to the one-side breathable base sheet 41, and is separable from the one-side breathable base sheet 41. Similar to a conventional check valve, both sides of the valve sheets 61 are fixed by the above-described first side seal 81 and the second side seal 82, however, most of the center of the valve sheet 61 is separable from the one-side breathable base sheet 41.

Next, the auxiliary sheet 51 will be described. The auxiliary sheet 51 is provided for balancing the lamination structure and the seals in relation to the valve sheet 61, and is sealed to the one-side breathable base sheet 41. In this example, the auxiliary sheet 51 is fixed by the auxiliary fixing seal 75, the second lower end seal 76, and the first lower end seal 77. However, the auxiliary sheet 51 and the one-side airtight base sheet 31 are not necessarily bonded by the same seal, and may be bonded by different seals. The upper end of the auxiliary sheet 51 is not bonded to the one-side breathable base sheet 41, and is slightly separable from the one-side breathable base sheet 41, however, the uppermost end of the auxiliary sheet 51 may be sealed by the auxiliary fixing seal 75, and the auxiliary sheet 51 may be integrated with the one-side breathable base sheet 41. In the example shown in the drawing, a gap is provided between the upper end of the auxiliary sheet 51 and the lower end of the valve sheet 61. The upper end of the auxiliary sheet 51 and the lower end of the valve sheet 61 may overlap each other, however, the upper end of the auxiliary sheet 51 must be positioned on the back surface side relative to the lower end of the valve sheet 61. The auxiliary sheet 51 may not be provided, and in the check valves of the examples shown in FIG. 4 and subsequent drawings, the auxiliary sheet 51 is not provided.

Last, the other-side airtight base sheet 21 will be described. The upper portion of the other-side airtight base sheet 21 is sealed to the upper portion of the one-side breathable base sheet 41 by a first upper end seal 71 and a second upper end seal 72. The first upper end seal 71 and the second upper end seal 72 also connect the right and left sides (right and left side seals) of the bag similar to the second lower end seal 76 and the first lower end seal 77, and in this example, seal at least the second side seal 82 on the left and the second side seal 82 on the right to each other. Then, the portion between the first upper end seal 71 and the second upper end seal 72 is a non-sealed portion. To this non-sealed portion, a storage body fixing seal 84 for sealing to the bag sheet 1b is applied, and accordingly, the check valve 10 is fixed to the bag sheet 1b.

Here, summarizing the bag sheet 1b, the bag sheet 1b seals the first side seal 81 and the second side seal 82 on the both left and right side to each other, the first lower end seal 77 and the second lower end seal 76 on the lower side to each other, and seals the first upper end seal 71 and the second upper end seal 72 on the upper side to each other, and the entire periphery including the upper, lower, right, and left sides of the check valve 10 to the bag sheet 1b, and a fluid that flowed from the inlet 11 on the back surface side of the upper portion into the inside of the bag 1a passes through the valve flow channel 13 inside the check valve 10, and flows out to the outside of the bag 1a from the opening 1c through the outlet 12 on the front surface side of the lower portion.

In this check valve 10, the portion between the other-side airtight base sheet 21 and the valve sheet 61 opposed to the other-side airtight base sheet 21 serves as the valve flow channel 13. In the valve flow channel 13, the other-side airtight base sheet 21 and the valve sheet 61 normally overlap each other, and a fluid that flowed in from the inlet 11 moves the valve sheet 61 to the back surface side, and accordingly, the valve flow channel 13 opens and the fluid flows out. Even when the fluid flows in the opposite direction, the pressure in the portion between the valve sheet 61 and the other-side airtight base sheet 21 becomes negative as compared with the pressure in the portion between the valve sheet 61 closed by the fixation portion 14 and the inlet 11 and one-side airtight base sheet 31, so that the valve sheet 61 comes into close contact with the other-side airtight base sheet 21 and the valve flow channel 13 closes. Therefore, the length of the other-side airtight base sheet 21 is set on condition that the above-described valve function is performed, and the lower end of the other-side airtight base sheet 21 is set at a position which is lower than the fixation portion 14 and at a position where close contact with the valve sheet 61 is secured. In the example shown in the drawing, the lower end of the other-side airtight base sheet 21 is set to be lower than the lower end of the valve sheet 61, however, the position of the other-side airtight base sheet 21 may be the same as or higher than the position of the valve sheet 61. The lower end of the other-side airtight base sheet 21 is at substantially the same position as the upper end of the auxiliary sheet 51, however, the lower end of the other-side airtight base sheet 21 may be higher than, or according to the circumstances, may be lower than the upper end of the auxiliary sheet 51. The portion between the lower end of the other-side airtight base sheet 21 and the sheet on the back surface side thereof serves as the outlet 12, however, in this example, as described above, the outer periphery of the check valve 10 is bonded to the bag sheet 1b by the storage body fixing seal 84, so that the portion between the lower end of the other-side airtight base sheet 21 and the storage body fixing seal 84 on the lower side (specifically, the storage body fixing seal 84 between the second lower end seal 76 and the first lower end seal 77) serves as the outlet 12.

A fluid that flowed out from the outlet 12 flows out to the outside of the bag 1a from the opening 1c. In FIG. 1, the opening 1c is provided at substantially the same position as that of the outlet 12 on the lower side, however, it may be provided at any position as long as the position is inside of the storage body fixing seal 84. According to the circumstances, it is also possible that the other-side airtight base sheet 21 is not provided and the bag sheet 1b is commonly used as the other-side airtight base sheet 21, however, in this case, the opening 1c serves as the outlet 12, so that the opening 1c is provided at a position lower than the fixation portion 14 at a position where close contact with the valve sheet 61 and the bag sheet 1b is secured.

The check valve 10 having the above-described structure is used after it is sealed at the entire periphery to the bag sheet 1b, and unlike Patent Documents described above, the check valve 10 is not fixed by heat seal to the bag 1a at the position of the fixation portion 14, so that it is not necessary to provide welding preventive means such as a heat-resistant ink or a heat-resistant plate for preventing the portion as the valve flow channel 13 between the other-side airtight base sheet 21 and the valve sheet 61 from being heat-sealed concurrently. However, if the internal pressure of the bag 1a increases, as shown by the arrow in FIG. 1, a pressure is applied in the thickness direction to the entirety of all sheets constituting the check valve 10. Therefore, the other-side airtight base sheet 21 and the valve sheet 61 come into close contact with each other, and a valve opening operation for opening the valve by moving the valve sheet 61 by a fluid that flowed in from the inlet 11 may not be smoothly performed.

Therefore, according to the present invention, introduction recesses 15 for smoothly moving the valve sheet 61 by a fluid are provided. In this example, as shown in FIG. 2(A) and FIG. 2(D), introduction recesses 15 are partially provided on the fixation portion 14 and the one-side breathable base sheet 41 on the upstream side of the fixation portion 14. The introduction recesses 15 are formed by forming the fixation portion 14 by the first valve fixing seal 73 and the second valve fixing seal 74 and then pressing a mold (not shown) from the front surface side to the back surface side of the valve sheet 61. This mold is preferably heated in advance to partially melt the valve sheet 61 and the one-side breathable base sheet 41, however, the sheet can be recessed without heating the mold immediately after the formation of the fixation portion 14. Instead of this method using a mold, a sheet provided with irregularities in advance can also be used, or the introduction recesses can be formed by an appropriate method, however, by the method using a mold after the formation of the fixation portion 14, the introduction recesses can be most accurately and satisfactorily formed when the irregularities are formed on the melted seals of the fixation portion 14.

The introduction recesses 15 may be directionless like spots or planar shapes, however, they preferably have directionality. As the directionality, provision in the up-down direction along the fluid flow direction is more preferable than provision in the direction orthogonal to the fluid flow direction. In particular, the introduction recesses are preferably provided so that the irregularities are formed in the width direction of the valve sheet 61, and preferably provided at a position including the upper end of the valve sheet 61. The reason for this is that the upper end of the valve sheet 61 is a portion that serves as a weir for a flow from the inlet 11 to the valve flow channel 13, and by providing the introduction recesses 15 on this portion serving as a weir, a smooth valve sheet 61 is realized. In this example, the lower ends of the introduction recesses 15 are within the first valve fixing seal 73. The first valve fixing seal 73 and the second valve fixing seal 74 sandwich a portion that is not sealed, and the introduction recesses 15 are not formed on the second valve fixing seal 74. This is a measure for preventing smoothness of the valve sheet 61 from being lost more than necessary due to the mold of the introduction recesses 15, and for securing close contact between the valve sheet 61 and the other-side airtight base sheet 21 when the valve closes. However, the introduction recesses 15 may range to the second valve fixing seal 74 and may be further extended to the downstream portion of the fixation portion 14 on the valve sheet 61 as long as the close contact between the valve sheet 61 and the other-side airtight base sheet 21 when the valve closes is not lost. On the other hand, the upper ends of the introduction recesses 15 may be provided on the one-side breathable base sheet 41 on the upstream side over the fixation portion 14. By providing the introduction recesses 15 on the one-side breathable base sheet 41, a fluid can be more smoothly guided to the valve flow channel 13. According to the circumstances, the introduction recesses may be provided only on the one-side breathable base sheet 41, however, provision on the fixation portion 14 of the valve sheet 61 is advantageous for getting over the weir as described above.

Figure 3:
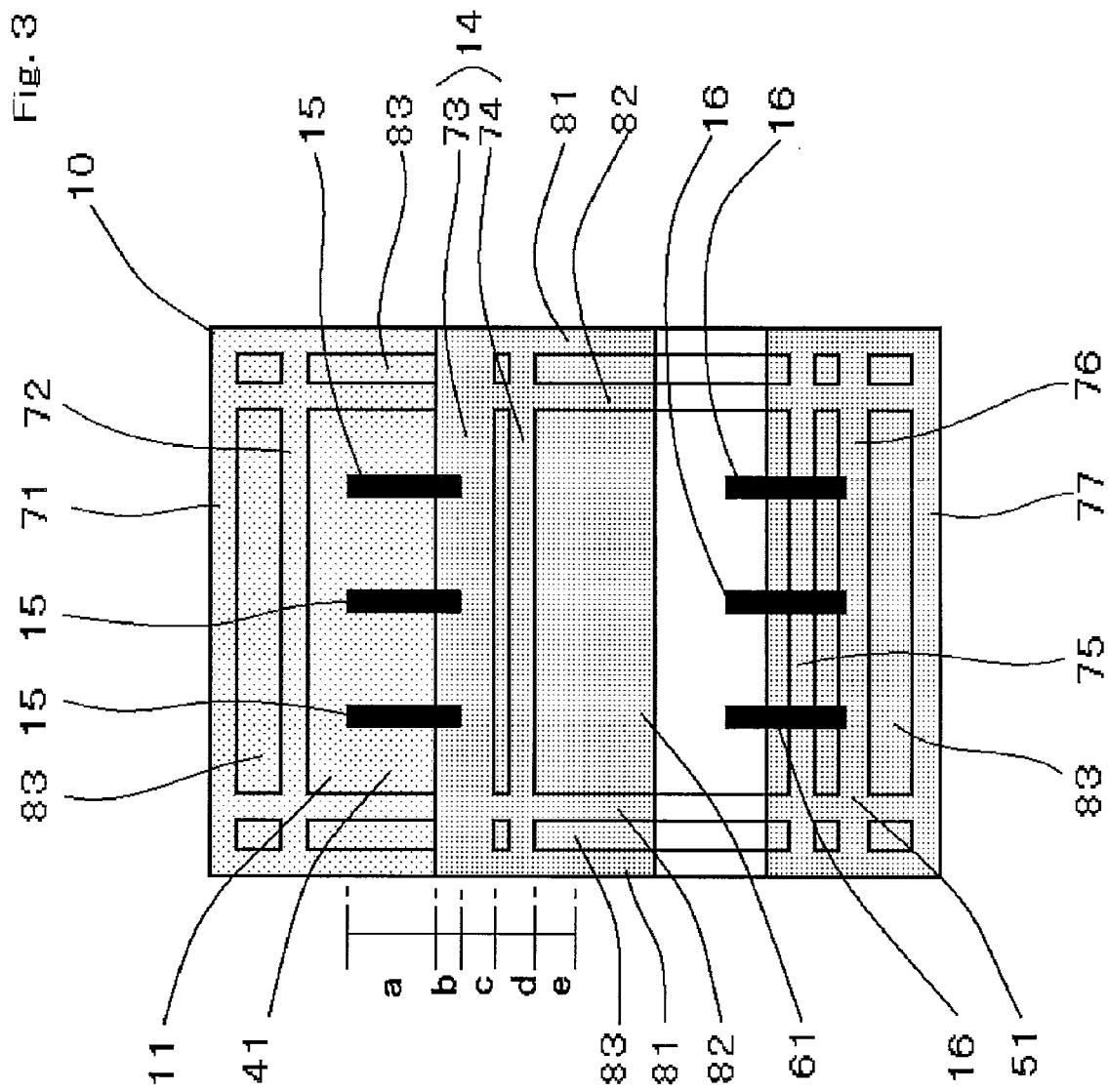
FIG. 3 is a front view showing a state that a first base sheet of the same check valve is removed.

This will be described with reference to FIG. 3. When the section a (the portion of the inlet 11 of the one-side breathable base sheet 41), the section b (the upper portion of the first valve fixing seal 73), the section c (the lower portion of the first valve fixing seal 73), the section d (the second valve fixing seal 74), and the section e (the movable portion lower than the second valve fixing seal 74 of the valve sheet 61) are defined, the introduction recesses 15 according to the preferred embodiment shown in the drawing are provided in the section a to the section b. Other examples are also possible in which the introduction recesses are provided only in the section b, in the section b to the section c, in the section b to the section d, in the section b to the section e, in the section a to the section c, in the section a to the section d, in the section a to the section e, and only in the section a, etc. Even when the fixation portion 14 is not divided into the first valve fixing seal 73 and the second valve fixing seal 74 but is formed as one seal portion, the introduction recesses 15 can be provided in the same manner as described above.

In the above-described examples, the introduction recesses 15 are provided on the valve sheet 61 and the one-side breathable base sheet 41, however, the introduction recesses 15 may be provided on the other-side airtight base sheet 21 on the opposite side. In this case, the introduction recesses 15 may be provided only on the other-side airtight base sheet 21, or may be provided on both of these sheets. The positions at which the introduction recesses 15 are provided are set to be the same as the positions of the introduction recesses 15 on the side of the valve sheet 61 and the one-side breathable base sheet 41 in the direction of thickness of the sheets, and are provided at positions shown by using the sections in the above-described examples.

Three introduction recesses 15 are provided, however, at least one introduction recess is necessary, and the number of introduction recesses can be appropriately changed according to the lateral width of the valve flow channel 13. Further, a flow channel limiting seal (not shown) can also be provided to bond the valve sheet 61 and the one-side breathable base sheet 41 to the other-side airtight base sheet 21.

Next, auxiliary recesses 16 will be described. The auxiliary recesses 16 are provided on a portion including the upper end of the auxiliary sheet 51, and are provided from the lower portion of the one-side breathable base sheet 41 to the auxiliary sheet 51. The auxiliary recesses 16 are provided for balancing with the introduction recesses 15 and restraining movements of the auxiliary sheets 51, and the auxiliary recesses may not be provided.

Last, a method for manufacturing this check valve 10 will be described. At the time of manufacturing, a continuous welding device for a sheet that is generally used for manufacturing a sheet-like check valve can be used. First, four rolls made of webs for forming sheets are prepared. A first web is for the one-side airtight base sheet 31, a second web is for the inlet 11, a third web is for the auxiliary sheet 51 and the valve sheet 61, and a fourth web is for the other-side airtight base sheet 21.

The auxiliary sheet 51 and the valve sheet 61 are formed by forming a slit that becomes a boundary between the auxiliary sheet 51 and the valve sheet 61 in the third web. For adjusting their lengths in relation to the inlet 11, slits are formed in the first web and the third web.

In the first web, the second web and the third web, seals of the first valve fixing seal 73, the second valve fixing seal 74, the auxiliary fixing seal 75, and the second lower end seal 76 are formed.

In the first web, the second web, and the third web, the introduction recesses 15 and the auxiliary recesses 16 are formed.

The fourth web is supplied onto the first web, the second web, and the third web, and the first side seal 81, the second side seal 82, the first upper end seal 71, the second upper end seal 72, and the first lower end seal 77 are formed.

Last, check valves 10 may be separated from each other and then shipped, or may be wound like a continuous roll and shipped. Then, each check valve is supplied onto the bag sheet 1b for manufacturing the bag 1a, and the storage body fixing seal 84 is formed between the side non-sealed portion 83 and the bag sheet 1b and bonded. In FIG. 2(A), other seals are formed on the side non-sealed portion 83, however, it is also preferable that no seal is formed on the side non-sealed portion 83 to improve the completeness of sealing to the bag sheet 1b.

In the example of FIG. 1, the check valve 10 is attached to the inside of the bag 1a, however, it can also be attached to the outside. In this case, the inlet 11 is aligned with and attached to the opening 1c.

In the example of FIG. 1, on the assumption that the bag is used as a bag for storing coffee beans or rice, a compression storage bag for storing various items such as clothing or food, and a bag for pouring seasoning liquids or oil out, the check valve is used as a check valve that allows a fluid inside to flow out and prevents the fluid from flowing back from the outside to the inside.

To the contrary, the check valve can also be used as a check valve that allows a fluid to flow from the outside to the inside and prevents the fluid from flowing back from the inside to the outside. In detail, in order to allow a fluid to flow-in from the opening 1c of the bag 1a, in the case where the check valve is attached to the inside of the bag 1a, the back surface of the illustrated check valve 10 is attached along the bag sheet 1b, and the inlet 11 is aligned with and attached to the opening 1c of the bag 1a. In a similar example, when the check valve is attached to the outside of the bag 1a, the front surface of the check valve 10 is set along the bag sheet 1b and the opening 1c is aligned with and attached to the outlet 12. As a purpose of the bag 1a in this case, it can be used as a cushioning material in which air is sealed inside or as a liquid injection sealing bag by way of example. The check valve can also be used for a rigid container made of a synthetic resin plate, etc., as well as bags.

Next, another preferred embodiment will be described briefly, and the above-described description is applied when there is no description of the details.

Figure 4:
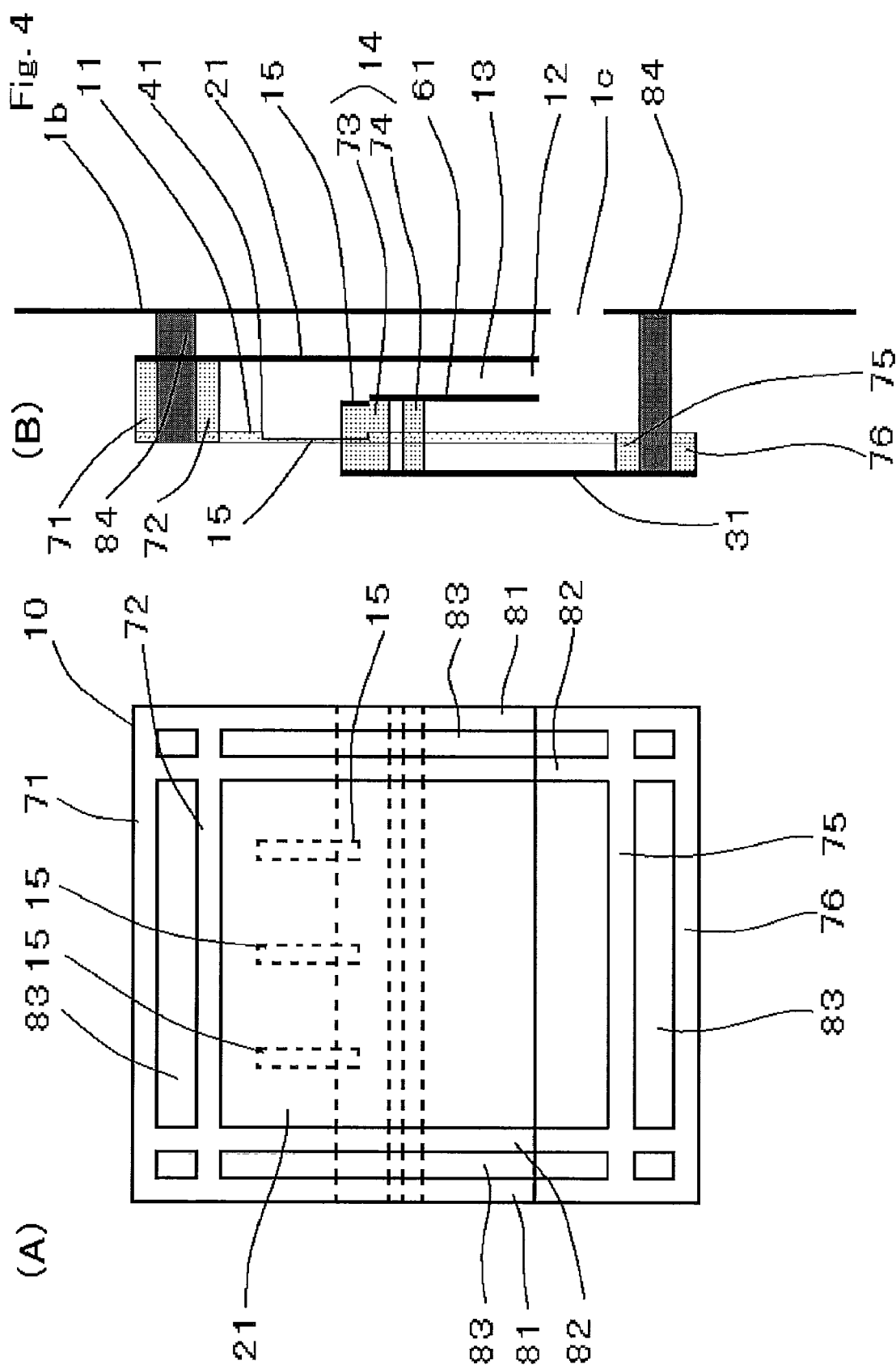
FIG. 4(A) is a front view of a check valve according to a second preferred embodiment.
FIG. 4(B) is a longitudinal sectional view of the same.

First, FIG. 4 shows an example in which the auxiliary sheet 51 is not provided. In this example, the outer periphery of the second lower end seal 76 is directly sealed and attached to the bag sheet 1b.

FIG. 5(A) shows an example in which the auxiliary sheet 51 is not provided and the one-side breathable base sheet 41 is provided only at the portion corresponding to the inlet 11. It is also possible that the one-side breathable base sheet 41 is provided only at the portion corresponding to the inlet 11 and the auxiliary sheet 51 is provided although this is not shown.

FIG. 5(B) shows an example in which neither the auxiliary sheet 51 nor the one-side breathable base sheet 41 is provided.

It is also possible that the one-side breathable base sheet 41 is not provided and the auxiliary sheet 51 is provided although this is not shown.

Figure 6:
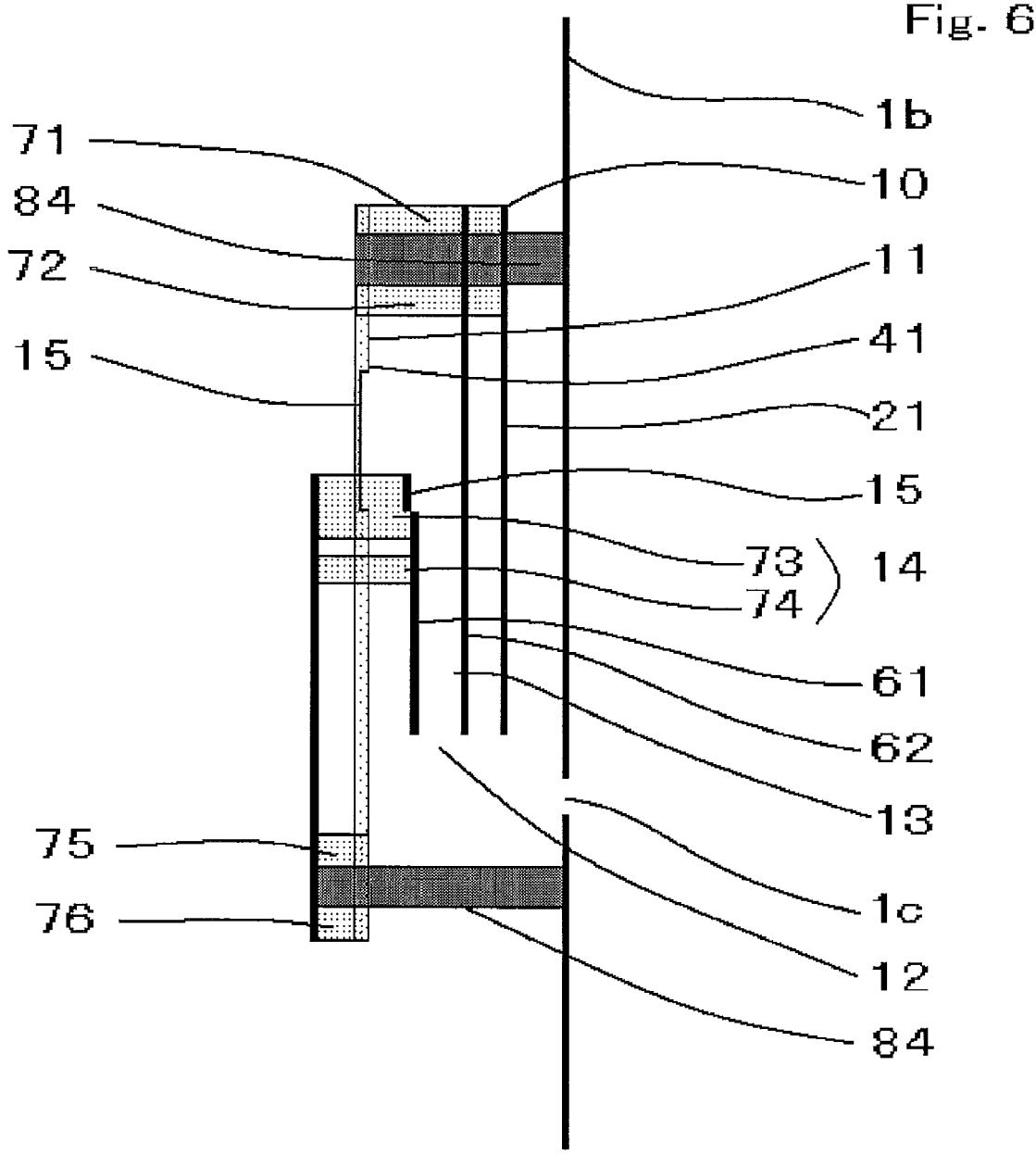
FIG. 6 is an essential portion sectional view showing a state that a check valve according to a fifth preferred embodiment is attached to a bag.

FIG. 6 shows an example in which the auxiliary sheet 51 is not provided and the second valve sheet 62 is provided on the front surface side of the valve sheet 61. It is also possible that the second valve sheet 62 is provided and the auxiliary sheet 51 is provided although this is not shown. In this example, the portion between the valve sheet 61 and the second valve sheet 62 serves as the valve flow channel 13. The second valve sheet 62 may be provided so as to have substantially the same shape and the same size as those of the other-side airtight base sheet 21, however, the shape and the size may be different as long as the valve function is performed. The second valve sheet 62 may be sealed and attached to the inlet 11 together with the other-side airtight base sheet 21, and the introduction recesses 15 may be provided on the second valve sheet 62.

The check valve of the present invention may include not only one valve flow channel but a plurality of partitioned valve flow channels.

Figure 7:
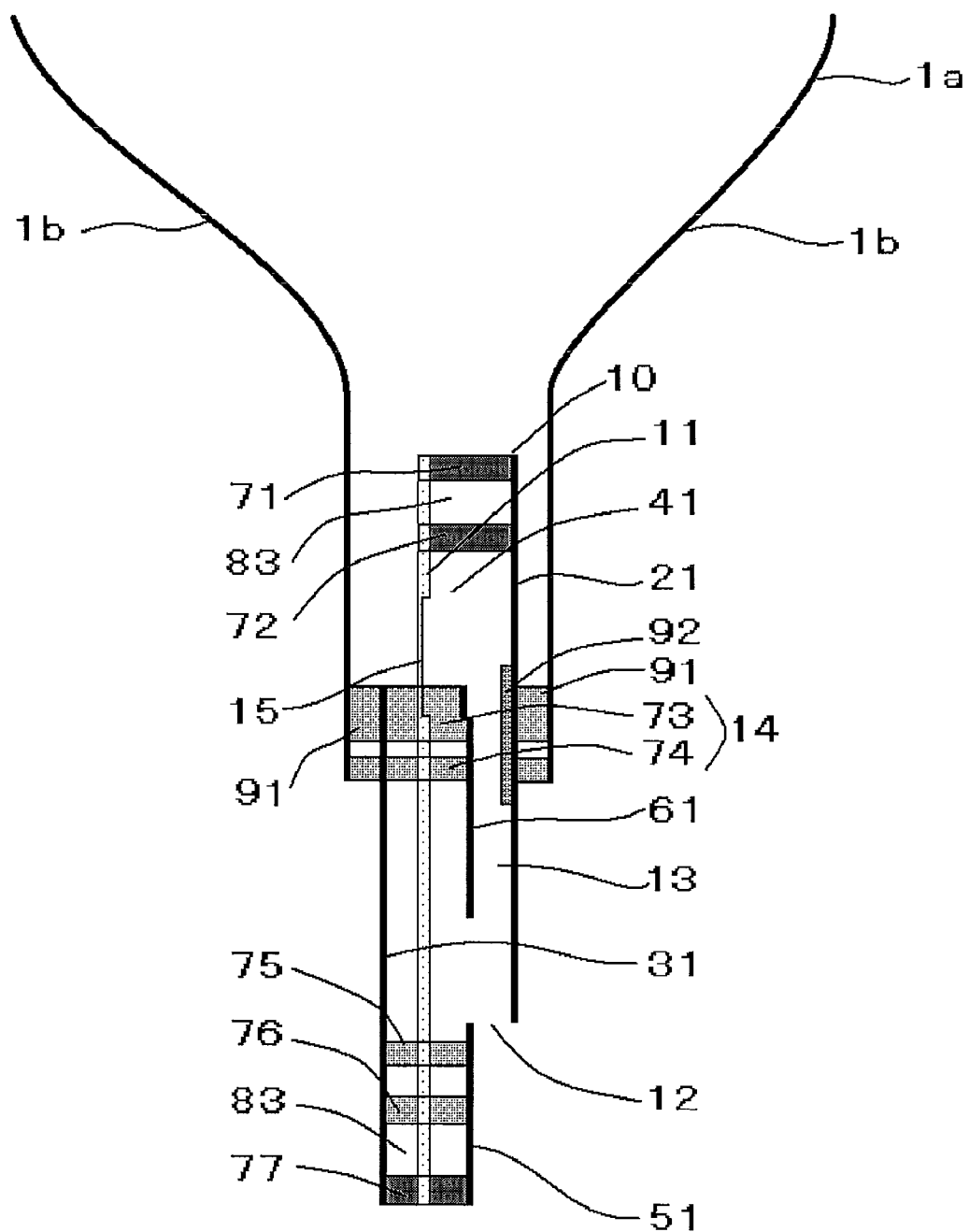
FIG. 7 is a sectional view showing a structure in which a check valve according to an example of the first preferred embodiment of the present invention is attached to a storage bag, different from the structure of FIG. 1.

Each of the check valves according to the preferred embodiments described above is used upon sealing its entire periphery to the bag sheet 1b, however, as in the case of the above-described Patent Documents, the check valve may be fixed by heat seal, etc., to the bag 1a at the position of the fixation portion 14. This example is shown in FIG. 7. In this attaching structure, the check valve 10 is sandwiched and fixed between the bag sheet 1b and the bag sheet 1b constituting the bag 1a. In detail, at the position of the fixation portion 14, a bag fixing seal 91 is formed between the bag sheet 1b on the front surface side and the front surface of the other-side airtight base sheet 21, and a bag fixing seal 91 is formed between the bag sheet 1b on the back surface side and the one-side airtight base sheet 31. For the bag fixing seals 91, an adhesive agent may be used, or heat seal may be applied. In order to prevent the valve flow channel 13 from being closed by heat of heat seal, a welding preventive portion 92 such as a heat-resistant ink is formed on the other-side airtight base sheet 21. This welding preventive portion 92 may be formed on the valve sheet 61 side, and may be formed on both of the other-side airtight base sheet 21 and the valve sheet 61 side. The bag fixing seal 91 and the fixation portion 14 (73, 74) may be heat-sealed by one heat seal. In this case, at the stage for shipping the check valve 10, heat seal of the fixation portion 14 (73, 74) is not performed, and at the stage for processing the bag 1a, the check valve 10 may be sandwiched between the bag sheet 1b and the bag sheet 1b at the stage of processing of the bag 1a and heat seal is applied.

DESCRIPTION OF SYMBOLS

1a Bag
1b Bag sheet
1c Opening
10 Check valve
11 Inlet
12 Outlet
13 Valve flow channel
14 Fixation portion
15 Introduction recess
16 Auxiliary recess
21 Other-side airtight base sheet
31 One-side airtight base sheet
41 One-side breathable base sheet
51 Auxiliary sheet
61 Valve sheet
62 Second valve sheet

What is claimed is:

1. A check valve comprising a plurality of layered sheets to have a valve flow channel formed as a space for fluid passage between the plurality of layered sheets, said check valve allowing a fluid to pass in a forward direction from an inlet to an outlet and blocking a flow of a fluid in a reverse direction from the outlet to the inlet by opening and closing the valve flow channel, wherein the plurality of layered sheets include a plurality of base sheets including a first side base sheet and a second side base sheet; and at least one valve sheet disposed between the plurality of base sheets, the valve sheet includes a fixation portion bonded to at least the first side base sheet, the fixation portion is bonded across the valve flow channel, a portion on a downstream side of the fixation portion of the valve sheet is separable from the first side base sheet, and a portion between the valve sheet and the second side base sheet or another valve sheet layered on the valve sheet is formed as the valve flow channel, whereby the check valve blocks the flow of the fluid between an inside and an outside of a storage body through an opening provided on the storage body, and wherein an entire periphery of the check valve is bonded to the storage body by a storage body fixing seal, and an area from the inlet to the outlet through the valve flow channel is positioned within a region surrounded by the storage body fixing seal, the valve flow channel along an entire length of the valve sheet is defined by the second side base sheet or said another valve sheet layered on the valve sheet and the valve sheet without breathable sheets positioned therebetween, a fluid introduction recess recessed in a thickness direction is formed on at least one of the second side base sheet or said another valve sheet layered on the valve sheet constituting the valve flow channel and the valve sheet, and the fluid introduction recess is provided on the fixation portion of the valve sheet or at a position on the upstream side of the fixation portion, and extends in an up-down direction of the valve flow channel for guiding the fluid along the forward direction.

2. The check valve according to claim 1, wherein the inlet is positioned on a front surface or a back surface of the check valve, the outlet is positioned on the back surface or the front surface opposite the inlet, and the front surface or the back surface of the check valve is along a surface or an inner surface of a storage body.

3. The check valve according to claim 1, wherein a part of the first side base sheet is formed as a fluid passage portion breathable to allow an air flow in the forward direction to pass through in a front-back direction, the fluid passage portion is an inlet through which an air flow in the forward direction flows to the inside of the check valve, the fluid passage portion is disposed on the upstream side of the fixation portion of the first side base sheet, and the fluid introduction recess is formed from the fluid passage portion to the fixation portion.

4. The check valve according to claim 1, wherein the fixation portion includes a first valve fixing seal and a second valve fixing seal formed on the downstream side of the first valve fixing seal, and the fluid introduction recess is not formed on the second valve fixing seal but is formed at a position including the first valve fixing seal.

5. A storage body to which the check valve according to any one of claims 1 to 4 is attached, wherein
the storage body includes bag sheets made of resin, and
the entire periphery of the check valve is bonded to the inside or the outside of the bag sheet.

6. The check valve according to claim 1, wherein the plurality of base sheets further includes a breathable base sheet, and the valve sheet is positioned between the breathable base sheet and the second side base sheet.

7. The check valve according to claim 1, wherein the fluid introduction recess is a stepwise recess.

* * * * *